United States Patent [19]

Clarke

[11] 3,998,535
[45] Dec. 21, 1976

[54] RESILIENT FRAME CONSTRUCTION FOR DISPLAYING TRANSPARENCIES

[76] Inventor: Jim Clarke, 148-150 Madison Ave., New York, N.Y. 10016

[22] Filed: July 31, 1975

[21] Appl. No.: 600,799

[52] U.S. Cl. .................................. 353/84; 353/95; 353/120; 353/DIG. 5
[51] Int. Cl.² ...................... G03B 21/14; G03B 1/44
[58] Field of Search ................. 353/31, 35, 44, 84, 353/95, 120, DIG. 5, 23, 36

[56] References Cited

UNITED STATES PATENTS

| 3,269,261 | 8/1966 | Porter | 353/35 |
| 3,537,792 | 11/1970 | Furniss et al. | 353/DIG. 5 |

FOREIGN PATENTS OR APPLICATIONS 507,569   6/1920   France ................................ 353/31

*Primary Examiner*—Steven L. Stephan
*Attorney, Agent, or Firm*—Charles E. Temko

[57] ABSTRACT

An improved frame construction for supporting transparencies for projection by an overhead optical projector, including means for maintaining a transparency in fixed position relative to the projector, and means for selectively adding color to desired areas of the transparency for directing the attention of the viewer, and adding interest to the display. The colored areas may be oriented in either of two mutually perpendicular directions.

3 Claims, 7 Drawing Figures

RESILIENT FRAME CONSTRUCTION FOR DISPLAYING TRANSPARENCIES

RELATED APPLICATION

Reference is made to my copending application, Ser. No. 584,769, filed June 9, 1975, which discloses a closely related invention.

BACKGROUND OF THE INVENTION

The use of overhead projectors for illustration and supplementing lectures and instructional material has become widespread in recent years owing to the ease with which the material for projection may be prepared, and the ready availability at relatively low cost of projection equipment. The projector normally consists of a light box which casts a converging beam of light into a prism-like element, which, in turn, casts a light beam upon a projection screen. In use, the material being projected is positioned upon the upper surface of a light transmitting wall forming part of the light box for support and illumination. Much of the currently used material is provided by running a specialized type of light-transmitting sheet material through electrostatic type copiers to obtain flexible but durable copies which can be used many times, and which are of standardized overall dimensions.

One of the problems encountered when using such transparencies is the tendency to slide upon the illuminated surface of the light box during projection, creating a disturbing effect upon the audience watching the display. Another problem lies in the fact that such copies reproduce material in essentially black and white, the continued use of which tends to become tiring.

It is known in the art to provide transparency positioning means for locating the center of the transparency in coincidence with the optical projection axis of the projector, but such structure precludes the use of color added to the projection system.

In my above mentioned prior application, there is disclosed an improved frame construction, the present disclosure relating to a further simplification of structure for accomplishing the same end.

SUMMARY OF THE INVENTION

Briefly stated, the invention contemplates the provision of an improved construction comprising a sheet of polished transparent glass or synthetic resinous substitute, having on each surface thereof a pair of synthetic resinous foam strips, the opposing surfaces of which define a channel corresponding to the width or length of a displayed informational sheet, and which frictionally engage the longer or shorter edges of the display sheet to maintain the same in proper projecting position. The foam strips on one surface are disposed at right angles to the strips on the opposite surface, so that each set of strips may support colored transparent members thereacross to allow the colored areas to correspond to the axis of the area to be emphasized. For example, a line of print may extend parallel to the length or to the width of a sheet. In either case, the device is positioned with the foam strips thereof perpendicular to the line of print after the sheet is positioned. The colored strips are supported by the foam strips and span the channel enclosing the display sheet.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
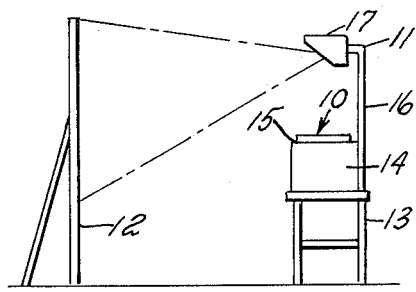
FIG. 1 is a side elevational view, somewhat schematic, of an embodiment of the invention in position for use with a known optical projector.

Referring to FIG. 1 in the drawing, the device, generally indicated by reference character 10, is shown in supported condition upon a conventional overhead optical projector 11 positioned to cast an image upon a vertically disposed projection screen 12. The projector 11 includes a supporting table 13, a light box 14 having an upper illuminated surface 15, and a vertical support 16 mounting a prismatic or reflective element 17, the details of which are well known in the art.

The device 10 includes a rectangular transparent base 20 preferably of polished sheet glass, and alternatively of hard synthetic resinous material, such as plexiglas or the like. It is bounded by side edges 21, end edges 22, a first planar surface 23 and a second planar surface 24.

Figures 3, 4:
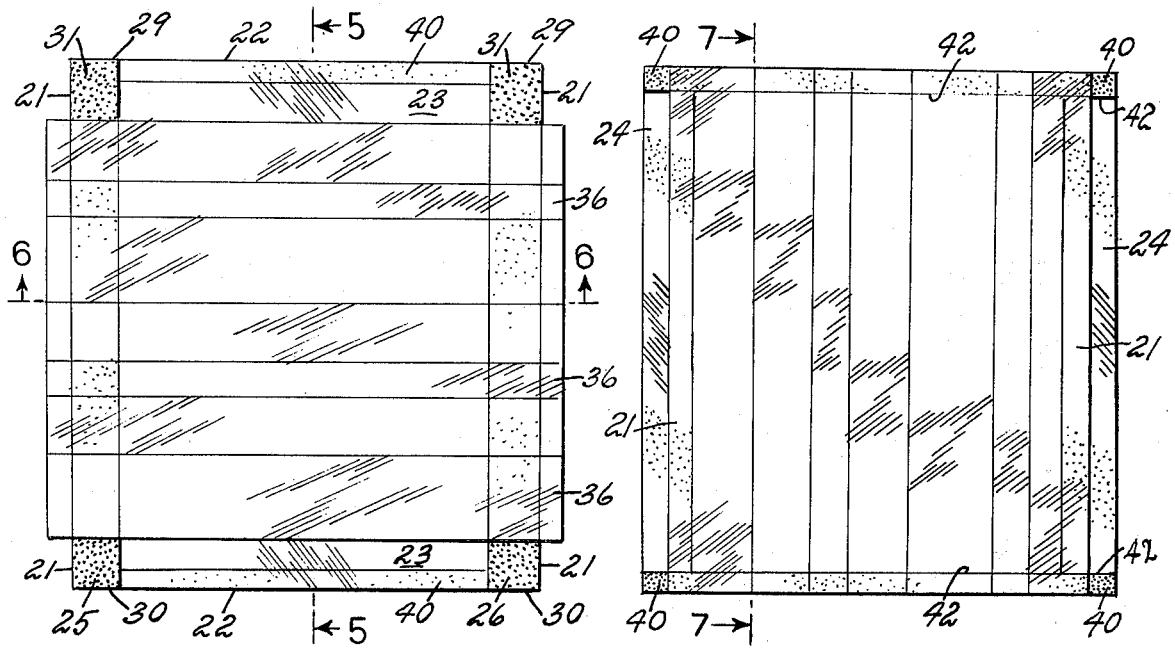
FIG. 3 is a plan view thereof showing one mode of use.
FIG. 4 is a similar plan view showing the device in inverted condition relative to the showing in FIG. 3, for a second mode of use.
Figure 5:
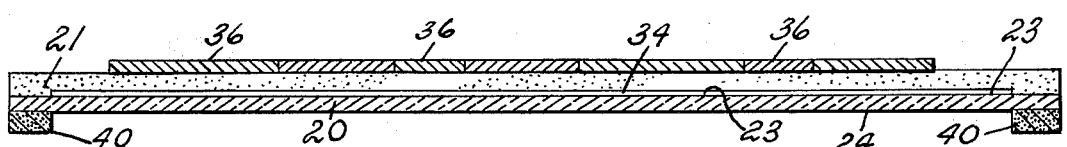
FIG. 5 is an enlarged sectional view as seen from the plane 5—5 in FIG. 3.
Figure 6:
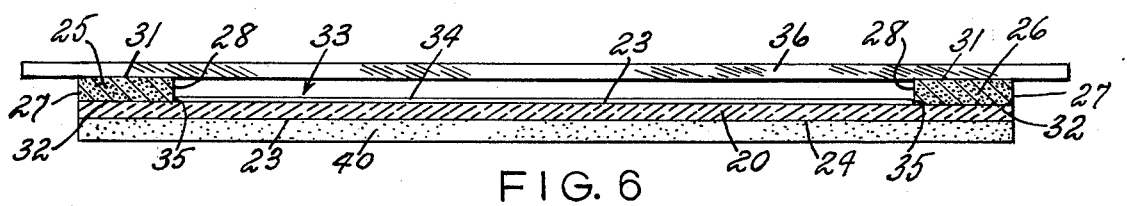
FIG. 6 is an enlarged sectional view as seen from the plane 6—6 in FIG. 3.
Figure 7:
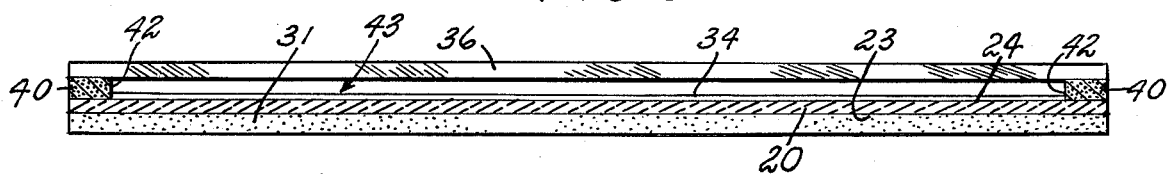
FIG. 7 is an enlarged sectional view as seen from the plane 7—7 in FIG. 4.

Referring to FIG. 3 in the drawing, a pair of first and second cushion strips 25 and 26, respectively, are secured to the first surface 23 in parallel relation abutting the side or longer edges 21, using a suitable adhesive not shown. The strips have a generally rectangular cross-section best seen in FIG. 6, and each includes an outer edge 27, an inner edge 28, end edges 29 and 30, an upper surface 31 and a lower surface 32. A channel 33 is formed by the side edges 28, for accommodating a transparent display sheet 34 (FIGS. 5–7), and engaging the longer edges 35 thereof.

A plurality of colored transparent members 36 are preferably formed of rigid synthetic resinous material, and are similar to those disclosed in the above mentioned pending application. These are positioned to overlie the channel 33 and rest upon the upper surfaces 31 of each of the strips 25–26, in order that certain selected areas of the image projected from the sheet 34 may be suitably delineated and emphasized.

Figure 2:
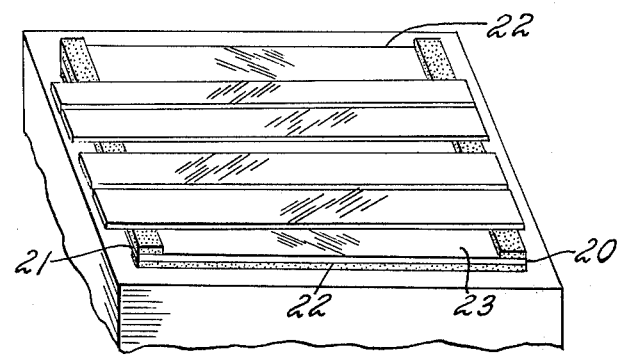
FIG. 2 is a fragmentary view in perspective of the embodiment.

Referring to FIG. 4, the second surface 24 is provided with a similar pair of strips 40, the opposed edges 42 of which define a second channel, the width of which corresponds to the length of the sheet 34. Channel 43 is exposed upon inverting the device from the position shown in FIG. 3 prior to allowing the same to rest upon the light box 14 (FIG. 2). The colored transparent members 36 span the channel 43, and can outline or emphasize displayed material, the axis of which is perpendicular to the channel 43. Depending upon which surface of the base is upwardly positioned, the resilient strips on the opposite surface will serve as a cushion and a frictional anchor to prevent the device 10 from shifting on the light box 14. Where the length and width of the device are relatively close in value, easy identity may be achieved by making one set of strips of effective width different from that of the other set, as exemplified in FIGS. 3 and 4.

It will be observed that while one set of strips serves to anchor the frame with respect to the light box, the other set forms a channel for the accommodation of the sheet to be displayed, and the upper surfaces thereof provide for frictional retention of the colored transparent members without the necessity of providing additional supports and/or guides. Thus, the device may be conveniently fabricated and assembled at very low cost, and without the necessity of resorting to any complicated machining operations.

I wish it to be understood that I do not consider the invention limited to the precise details of structure shown and set forth in this specification, for obvious modifications will occur to those skilled in the art to which the invention pertains.

I claim:
1. An improved frame construction for use in supporting transparencies in position for projection by an overhead optical projector comprising: a relatively rigid rectangular transparent sheet of material bounded by a pair of shorter edges, a pair of longer edges, and first and second parallel surfaces; a first pair of resiliently flexible planar strips of substantial thickness secured to said first surface of said sheet, each strip abutting one of said longer edges of said sheet at one edge of said strip and having a second parallel edge facing the corresponding edge of the other strip to define a channel for the selective engagement and frictional retention of a display sheet; a second pair of resilient flexible planar strips of substantial thickness secured to said second surface of said sheet, each strip abutting one of said shorter edges of said sheet along one edge of said strip, and having a second parallel edge facing the corresponding edge of the other of said second pair of strips to define a second channel for the selective engagement of said display sheet, the axis of said first and second channels being mutually perpendicular.

2. Structure in accordance with claim 1, including a plurality of colored transparent members selectively positioned upon planar surfaces of a pair of said strips to be frictionally retained thereby and extend across a channel therebetween.

3. Structure in accordance with claim 1, further characterized in said first pair of strips and said second pair of strips being of different widths to facilitate identification.

* * * * *